United States Patent

[11] 3,615,186

[72] Inventors Wilhelm Jahn-Held;
 Otto Braun, both of Kassel-Wilhelmshohe, Germany
[21] Appl. No. 883,556
[22] Filed Dec. 9, 1969
[45] Patented Oct. 26, 1971
[73] Assignee Wintershall Aktiengesellschaft
 Kassel, Germany

[54] PROCESS OF MAKING HYDRATES OF POTASSIUM-MAGNESIUM PHOSPHATES
 14 Claims, 2 Drawing Figs.
[52] U.S. Cl. .................................................. 23/107,
 23/105, 71/34
[51] Int. Cl. ....................................................C01b 25/26,
 C01b 25/30, C01b 25/32
[50] Field of Search .......................................... 23/106,
 107, 105, 109; 71/34

[56] References Cited
 FOREIGN PATENTS
 1,265,726  4/1968  Germany.......................  23/105

*Primary Examiner*—Earl C. Thomas
*Assistant Examiner*—Gregory A. Heller
*Attorney*—Michael S. Striker

ABSTRACT: Hydrates of potassium-magnesium phosphates are made by (a) reacting phosphoric acid with an aqueous solution of an aliphatic water-soluble amine wherein the amine is present in an excess sufficient to cause only about one half of the amount of the amine to be used up in the reaction; (b) then dissolving in the solution $K_2SO_4$ in an amount per equivalent of $P_2O_5$ equal to the stoichiometric amount or up to 5 percent in excess thereof; (c) then pouring an aqueous solution of $MgSO_4$ into the mixture while stirring, the amount of $MgSO_4$ being about 2 equivalents per equivalent of $P_2O_5$ and causing precipitation at a pH between about 11.0 and 14.0 and (d) separating the precipitated $KMgPO_4$ hydrate.

AMOUNTS IN PARTS BY WEIGHT FIG. 1b
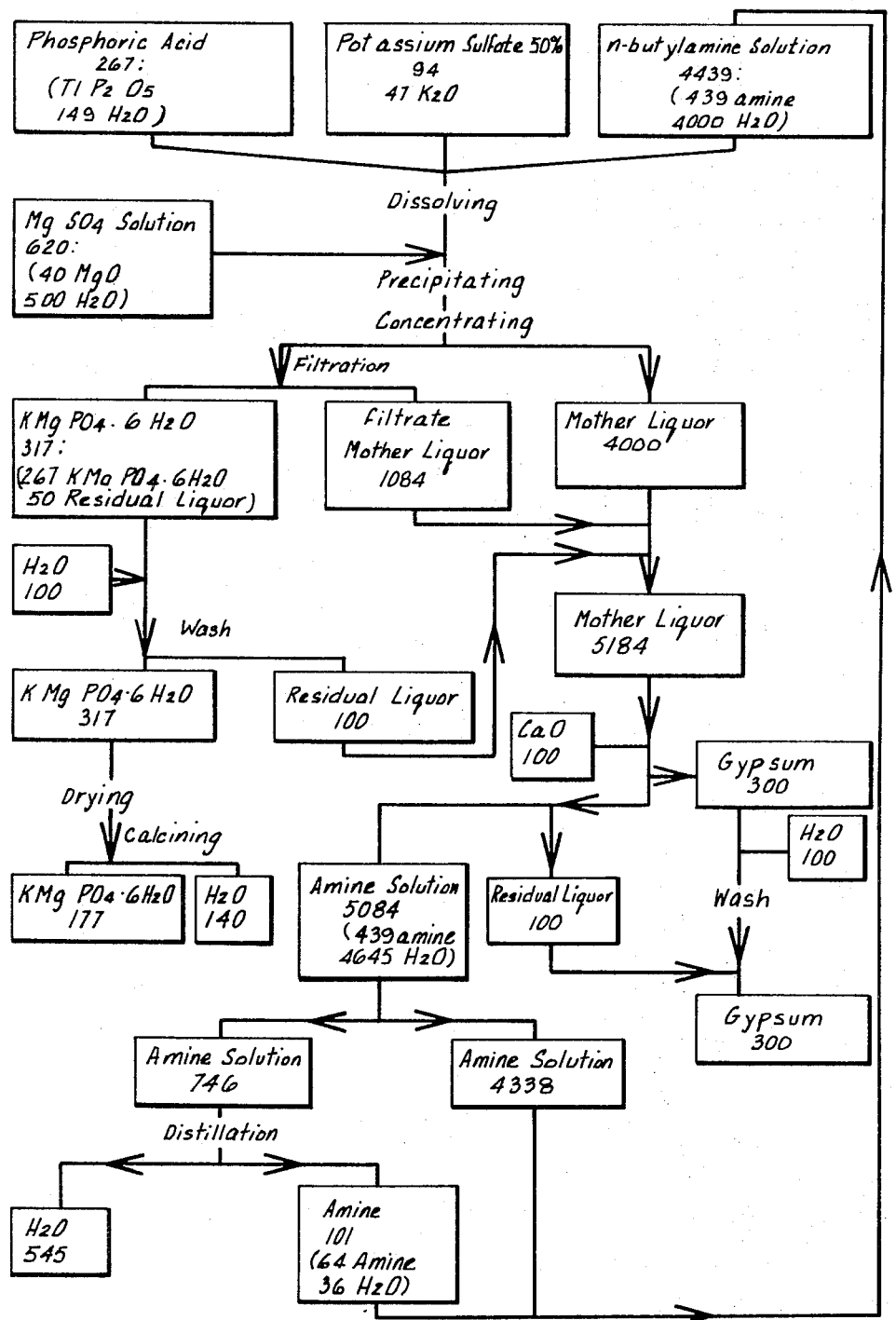

PROCESS OF MAKING HYDRATES OF POTASSIUM-MAGNESIUM PHOSPHATES

BACKGROUND OF THE INVENTION

The present invention relates to a process for making potassium-magnesium phosphate hydrates.

These hydrates have been made previously from KCL and $MgCl_2$ by using short-chain, water-soluble amines such as isobutylamine. If in this case a wet-process phosphoric acid was employed, considerable difficulties arose in the filtration of the precipitated final product because of the presence of organic materials and of Ca and F compounds.

There was obtained a slimy precipitate which is hard to filter. If settling agents are employed, the precipitate contains fluorine at an undesirably high rate, for instance 1.8 percent fluorine. Since it is necessary for the precipitation to employ the amines in an excess in order to obtain an alkaline reaction mass, the economy of this operation depends to a substantial extent on the recovery of the amine. The amine is driven off from the amine-salt solution by distillation over CaO which results in losses up to 10 percent. There are also substantial losses in $K_2O$ which may be up to 30 percent. Difficulties also exist in separating the resulting $CaCl_2$ solution and disposing of it.

The object of the present invention therefore is to avoid these shortcomings and to permit the use both of the thermally obtained and of a wet-process phosphoric acid in an economical way to obtain the hydrates of potassium-magnesium phosphates.

SUMMARY OF THE INVENTION

This object is obtained by a process comprising the steps of a. reacting thermally or by-wet-process-obtained phosphoric acid with an aqueous solution of an aliphatic primary, secondary or tertiary straight or branched water-soluble amine having from 3 to 10 carbon atoms, the amine being present in an excess sufficient to cause only about one half of the amount of amine to be used up in the reaction;

b. then dissolving $K_2SO_4$ in the solution in an amount equal to the stoichiometric amount or up to 5 percent in excess thereof per equivalent of $P_2O_5$;

c. then adding an aqueous solution of $MgSO_4$ to the mixture while stirring, the amount of $MgSO_4$ being about 2 equivalents per equivalent of $P_2O_5$, and causing precipitation of the hydrate at a pH between about 11.0 and 14.0 and d. separating the formed $KMgPO_4$ hydrate after completion of the precipitation.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1b is a similar flowsheet giving the weight parts employed in a specific example.

DESCRIPTION OF THE PREFERRED EMBODIMENTS

Figure 1A:
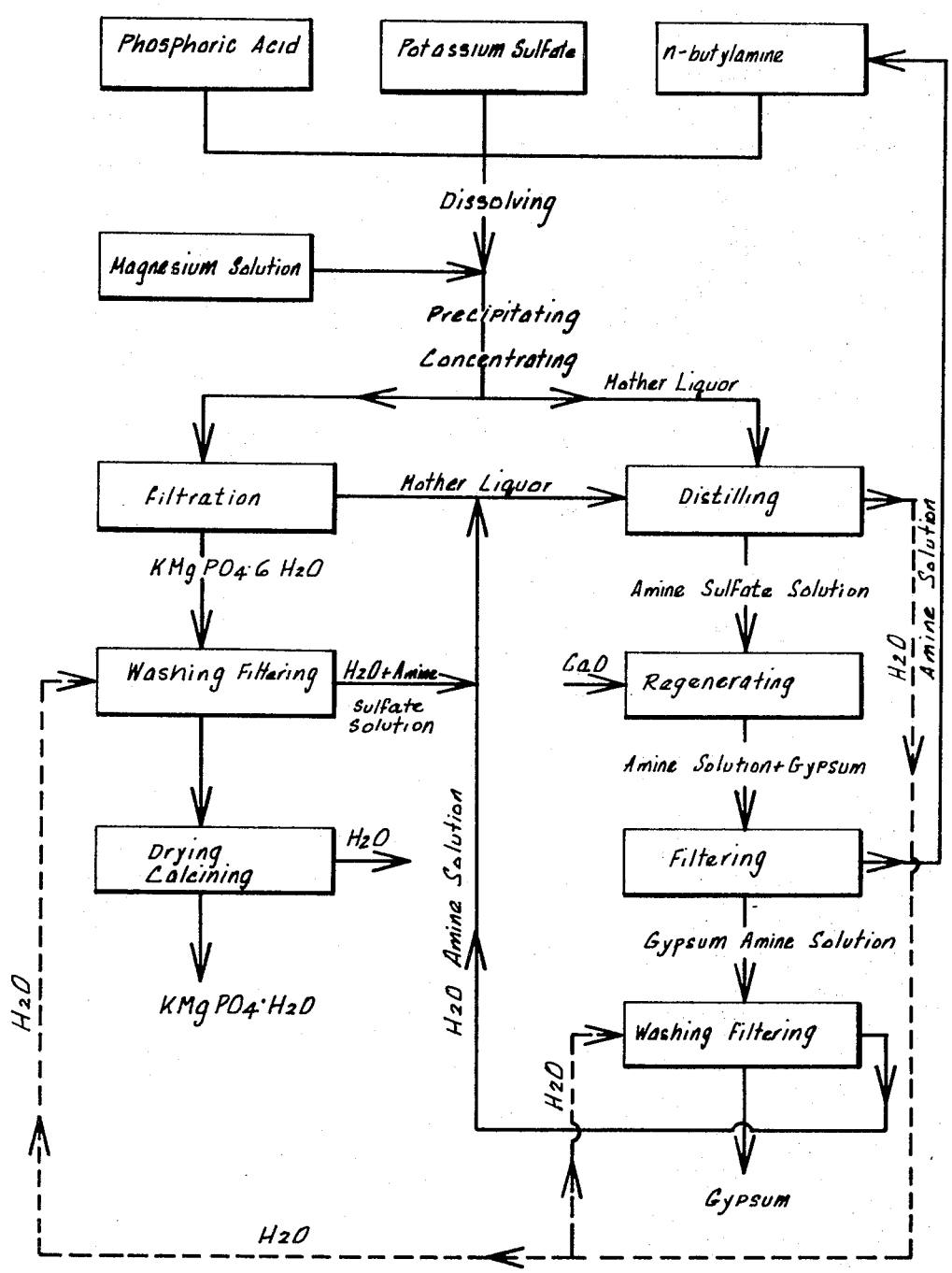
FIG. 1a illustrates by way of a flowsheet the making of a hexa- or monohydrate of potassium-magnesium phosphate.

The amines employed in the invention preferably have from three to five carbon atoms. Specific examples of preferred amino compounds are the following: 1-aminopropane (= n-propylamine), 2-aminopropane (= iso-propylamine), 1-aminobutane, 2-aminobutane, 1-amino-2-methyl-propane, 1-aminopentane (= n-amylamine), 1-amino-3(= (=iso-amylamine), 2-amino-2-methylbutane, di-iso-propylamine, di-n-butylamine and triethylamine.

The addition of the $MgSO_4$ solution to the mixture of phosphoric acid, amine and $K_2SO_4$ preferably is effected by slowly pouring in the $MgSO_4$ solution during a period between 2 and 4 hours.

The preferred pH range for the precipitation is between 12.1 and 11.5.

The mother liquor which remains after precipitation and separation of the potassium-magnesium phosphate hydrate is preferably stirred with an equivalent amount of calcium oxide or an excess thereof up to about 20 percent so as to precipitate gypsum ($CaSO_4$). The gypsum may then be washed and the solution of the free amine remaining from the gypsum precipitation may be recirculated into the process.

The precipitated $KMgPO_4$ is preferably subjected to a wash, and the wash water is added to the residual mother liquor for reaction with the calcium oxide and precipitation of gypsum.

The preferred concentration for the amine solution in step (a) of the process is between 10 and 30 percent and most preferably between 10 and 15 percent. The concentration of the phosphoric acid in the case of wet phosphoric acid during stage (b) is preferably between about 30 and 75 percent and in case of thermally obtained phosphoric acid between about 70 and 95 percent. The concentration of the $MGGSO_4$ solution in the precipitation reaction is preferably between about 10 and 35 percent.

The precipitation and recovery of the hydrate may be effected at room temperature, in which case a hexahydrate will be formed. The hexahydrate may then be converted to the monohydrate by calcination at temperatures from about 70° to 120°C.

The precipitation and recovery can also be effected, however, at temperatures above 90° C. in which case a monohydrate will result.

If the amine solution remaining after the precipitation of the gypsum by means of calcium oxide is recirculated, it is preferable to remove water from part of the amine solution, preferably from about 5 to 20 percent of the total amine solution. This water removal can be effected by distillation.

If a hexahydrate is obtained in the main reaction which subsequently is dehydrated to the monohydrate, this has the advantage that the precipitation can be carried out at room temperature.

The rapid separation of the precipitate in stage (d) can be accomplished by decanting the principal amount of the mother liquor as a clear solution after completion of the precipitation or by siphoning off the mother liquor. In case of a continuous operation, a precipitate is preferably subjected to a concentration (thickening) in a round-bottom settling tank. The concentrated salt then contains all of the sludge portion. The salt can be used as a filter aid and thus will shorten the filtration time.

The purification of the phosphoric acid by precipitation of the silicic acid as silicofluoride and the removal of organic components prior to the addition of the amine is therefore not necessary in the process of the invention.

Because of the use of $K_2SO_4$ instead of the conventional $MgCl_2$, it is possible to effect the precipitation of gypsum by means of calcium oxide (quicklime) and subsequently to separate the gypsum. The amine thus remains in the mother liquor and does not require distillation, although a minor proportion thereof may be subjected to such distillation to remove water, as indicated above. All excess amounts of the components with $K_2O$, MgO and $P_2O_5$ in the operation of the invention thus remain in the mother liquor and do not cause any loss.

It is, however, advisable to avoid using the $K_2SO_4$ in excess of more than 5 percent of the stoichiometric amount. Otherwise, an amount of only 30–70 percent of the $SO_3$ content is precipitated as $CaSO_4$, and the remaining amount stays in solution. The reason is the formation of KOH. The equilibrium of the reaction between $K_2SO_4$ and CaO to form KOH and $CaSO_4$ is far to the side of the $K_2SO_4$. Therefore, not all of the $SO_3$ is precipitated as gypsum. In that case, there is not enough free amine in the recirculated amine solution to neutralize the phosphoric acid and thus the precipitation of the hydrate of $KMgPO_4$ is disturbed.

It is therefore desirable to obtain rather complete precipitation or elimination of $SO_3$. This is an important element in using $K_2SO_4$ instead of the chlorides heretofore employed. Thus, the replacement of the chlorides by sulfates in the process of the invention is based on a definitely new approach.

Only if the $SO_3$ is practically completely eliminated up to a residual amount of about 1 g./l. is it possible to use the recirculated amine solution and thus to carry out the process in a continuous operation, which is a special feature of the present process.

It is also important that, with the process of the invention, the pH value must not go down too much. Otherwise, there is an increasing amount of magnesium phosphate obtained which is free of potassium, such as $MgHPO_4 \cdot 3H_2O$. In that case, the object of the invention could not be obtained.

Because of the contents of a wet-process phosphoric acid in $H_2SO_4$ or HF, a reduction of the excess of amine may occur. In that case, for instance, aminosulfate may be formed which uses the pH value of the amine-phosphate solution in the first stage of the invention. In that case, a pH of for instance .8 would exist and the precipitation product obtained in stage (c) would only contain 16.7 (80) percent % $K_2O$ instead of 26.7% of $KMgPO_4 \cdot H_2O$. In this case, the product would have an Mg content of about 28.2 percent while the MgO content of $KMgPO_4 \cdot H_2O$ is only 22.9 percent. Such $K_2O$ losses would be unbearable for the industrial operation of the process.

However, by using an excess of amine in the first stage of the process, which in case of a wet-process phosphoric acid may be up to 100 percent relative to the phosphoric acid, it is possible to maintain the pH value from beginning to end of the precipitation at the level necessary at the precipitation stage.

The precipitation product obtained by the invention, after drying, has the following composition:

| | |
|---|---|
| $K_2O$ | 25.3 |
| MgO | 22.6 |
| $P_2O_5$ | 39.8 (%) |

In case of the use of thermally obtained phosphoric acid, it is possible to employ a lower excess of amine, for instance only up to 50 percent excess over the phosphoric acid, because the thermal phosphoric acid does not contain other acids which form salts of the amines. Thus, a reduction of the pH value does not occur to the same extent as in case of the wet-process phosphoric acid.

A precipitation product obtained with a thermal phosphoric acid without employing a $K_2O$ excess stage (b) after drying at 100° C. will have the following composition:

| | |
|---|---|
| $K_2O$ | 25.5 |
| MgO | 24.0 |
| $P_2O_5$ | 39.0 (%) |

With the process of the invention it is therefore possible to obtain a precipitation product of potassium-magnesium phosphate also in a continuous operation by using solid $K_2SO_4$ and $MgSO_4$ in solution, which product is a close approach to the theoretical value which is as follows:

| | |
|---|---|
| $K_2O$ | 26.70 |
| MgO | 22.86 |
| $P_2O_5$ | 40.23 (%) |

The process of the invention has the definite advantage that even wet-process phosphoric acid can be used without preceding purification and that, regardless of the degree of purity of the phosphoric acid employed, the filtration of the precipitate can be carried out in industrially acceptable periods of time.

Since, by the process of the invention, it is possible to subject the precipitated gypsum after separation to a wash and to introduce the wash water into the operation, there is practically no loss in the originally employed materials and in the recirculated amine solution. Thus, the losses occurring in conventional processes in $K_2O$, MgO and $P_2O_5$ are avoided.

A further advantage of the invention as already briefly mentioned is that the distillation of the amine may be either avoided entirely or that only a comparatively small amount, below 20 percent may be subjected to such distillation in order to remove a certain amount from the operation.

Thus, the costs of investment and operation for a large distilling plant for the entire amount of the amine are avoided. It is these costs and the poor yield of a stoichiometrically composed precipitate which heretofore prevented an industrially acceptable operation in making hydrates of potassium-magnesium phosphate.

We claim:
1. The process of making hydrates of potassium-magnesium phosphate comprising the steps of
   a. reacting thermally or by-wet-process-obtained phosphoric acid with an aqueous solution of an aliphatic primary, secondary or tertiary straight or branched water-soluble amine having from three to 10 carbon atoms, the amine being present in an excess, the said excess being, in case of the thermically obtained phosphoric acid, up to about 50 percent, and in case of wet-process phosphoric acid, up to about 100 percent;
   b. then dissolving $K_2SO_4$ in the solution in an amount equal to the stoichiometric amount or up to 5 percent in excess thereof per equivalent of $P_2O_5$;
   c. then adding an aqueous solution of $MgSO_4$ to the mixture while stirring, the amount of $MgSO_4$ being about 2 equivalents per equivalent of $P_2O_5$, and causing precipitation of the hydrate at a pH between about 11.0 and 14.0 and
   d. Separating the formed $KMgPO_4$ hydrate after completion of the precipitation.

2. The process of claim 1, wherein the water soluble amine has three to five carbon atoms.

3. The process of claim 1, wherein the water-soluble amine is selected from the group consisting of 1-aminopropane (= n-propylamine), 2-aminopropane (= iso-propylamine), 1-aminobutane, 2-aminobutane, 1-amino-2-methyl-propane, 1-aminopentane (= n-amylamine), 1-amino-3-methylbutane (= iso-amylamine), 2-amino-2-methylbutane, di-iso-propylamine, di-n-butylamine and triethylamine.

4. The process of claim 1, wherein the addition of the $MgSO_4$ solution in step (c) is carried out by slowly pouring the solution into the mixture of amine solution, phosphoric acid and $K_2SO_4$ during a period of between 2 and 4 hours.

5. The process of claim 1, wherein the precipitation of the hydrate is effected at a pH between about 12.1 and 11.5.

6. The process of claim 1, wherein the following concentrations are employed:
   a. of the amine solution in step (a): about 10 to 30 percent;
   b. of the phosphoric acid in step (b): : about 30 to 75 percent if a wet-process phosphoric acid is used and of about 70 to 95 percent if a thermal phosphoric acid is used;
   c. of the $MGGSO_4$ solution in step (c): about 10 to 35 percent.

7. The process of claim 1, wherein the precipitation is effected at room temperature to obtain a hexahydrate.

8. The process of claim 7, wherein the hexahydrate obtained is subjected to calcination at about 70° to 120° C. to convert it to the monohydrate.

9. The process of claim 1, wherein the precipitation of the hydrate is effected at a temperature above 90° C. to obtain a monohydrate.

10. The process of claim 1, wherein the mother liquor remaining after the precipitation and removal of the $KMgPO_4$ is mixed upon agitation with about an equivalent amount or an excess up to 20 percent of calcium oxide followed by recovery of the precipitated gypsum.

11. The process of claim 10, wherein the hydrate of potassium-magnesium phosphate obtained in the said precipitation and recovery is subjected to a wash and the wash liquid is added to the said mother liquor for said gypsum precipitation.

12. The process of claim 10, wherein the amine solution remaining after precipitation of the gypsum is recirculated into the process.

13. The process of claim 12, wherein part of the amine solution remaining after the precipitation and separation of the gypsum is subjected to distillation to remove water therefrom prior to said recirculation.

14. The process of claim 13, wherein the amount of amine subjected to said distillation is about 5 to 20 percent the total amine solution.

* * * * *